United States Patent [19]

Perkins

[11] 4,433,284

[45] Feb. 21, 1984

[54] POWER LINE COMMUNICATIONS BYPASS AROUND DELTA-WYE TRANSFORMER

[75] Inventor: William C. Perkins, Garland, Tex.

[73] Assignee: Rockwell International Corporation, El Segundo, Calif.

[21] Appl. No.: 366,127

[22] Filed: Apr. 7, 1982

[51] Int. Cl.³ .............................................. H04B 3/56
[52] U.S. Cl. .................................. 323/361; 340/310 R
[58] Field of Search ....................... 340/310 R, 310 A; 323/361; 336/5

[56] References Cited

FOREIGN PATENT DOCUMENTS 505858  8/1930  Fed. Rep. of Germany ... 340/310 R
27398   8/1923  France ............................ 340/310 R
34753  10/1929  France ............................ 340/310 R

*Primary Examiner*—William H. Beha, Jr.
*Attorney, Agent, or Firm*—V. Lawrence Sewell; Howard R. Greenberg; H. Fredrick Hamann

[57] ABSTRACT

Circuits for bi-directionally bypassing a delta-wye transformer with a balanced phase-to-neutral power line communication signal, using passive components. The circuits include a set of three capacitors connected in a wye configuration, each having one side connected to one of the three-phase power lines on the delta side of the transformer. The circuit further includes a network connected from the node of the wye configuration of capacitors to neutral, the network including an inductive reactor with one side connected to neutral and the other connected to the node of the wye windings of the transformer. Component values are selected so that the circuit is resonant from the three phase lines on the delta side of the transformer to neutral. Further, the voltage transformation ratio of the communication signal from the delta side to the wye side is made the same as the corresponding power voltage ratio of the transformer.

7 Claims, 3 Drawing Figures

POWER LINE COMMUNICATIONS BYPASS AROUND DELTA-WYE TRANSFORMER

BACKGROUND OF THE INVENTION

This invention relates to a circuit providing a bypass around a delta-wye tranformer in both directions for a balanced phase-to-neutral power line communications signal, while also providing a signal voltage ratio equivalent to the power line voltage ratio of the transformer. The bypass circuit utilizes passive components and is of a design which lends itself particularly to power line communication systems employing carrier frequencies in the 3-10 KHz range.

A balanced phase-to-neutral power line communications system is designed to provide the same signal voltage with respect to neutral on each of the conductors of a three phase line. Such a signal, balanced in each of the three phase conductors, does not significantly couple through a delta-wye transformer. This is because there is no connection to neutral on the delta side of the transformer, and the phase-to-phase signal voltage in the delta windings is designed to be zero. Therefore, in order to transmit the communications signal in a line containing, for example, a delta-wye distribution feeder step-down transformer, a bypass around the transformer must be provided for the signal.

Because it is desirable to be able to transmit the communication signal in either direction along the three phase lines which include the transformer, it is important that the bypass be bidirectional.

On either side of a distribution feeder transformer, there can be customer distribution transformers which provide, for example, a two-line voltage of 120 volts. Obviously, a customer distribution transformer providing 120 volts and located on the higher voltage side of a delta-wye feeder transformer must have a different voltage ratio than a customer distribution transformer providing 120 volts on the lower voltage side of the delta-wye transformer. It is desirable that the communications signals on the two 120-volt customer lines be in the same voltage range. Therefore, it is an advantage if the bypass around the delta-wye transformer provides the same voltage ratio for the communications signal as the delta-wye transformer provides to the power voltage.

SUMMARY OF THE INVENTION

The present invention provides a circuit of passive components for bypassing a delta-wye transformer in both directions for a power line communications signal which is a balanced phase-to-neutral signal on both sides of the transformer. The circuit includes three equal capacitors each having one side connected at a node to form a wye configuration, and each having the other side connected to a different phase conductor of the power line on the delta side of the transformer. An inductor with inductance L1 is connected between the node of the wye configuration of capacitors and the common node of the wye windings of the transformer. An inductive reactor with inductance L2 is connected from the node of the wye windings of the transformer to the common neutral of the three-phase lines. The capacitors, inductor and reactor are selected with values so that the parallel combination of the capacitors is resonant at the communications signal carrier frequency with the series combination of L1 and L2. This reduces the coupling impedance and maximizes the communication signal level in both directions of transmission. In a preferred embodiment of the invention, the voltage transformation ratio of the bypass circuit, given by $(L1+L2)/L2$, is made equal to the primary-to-secondary voltage ratio of the delta-wye transformer.

Another embodiment of the invention provides a particularly low reactance signal bypass path around the transformer. This embodiment differs from that described above in that a separate capacitor with capacitance C2 is connected from the node of the wye configuration of capacitors to the common neutral of the three phase lines. The parallel combination of the capacitance C2 and the capacitors in wye configuration is made resonant at the communication signal carrier frequency with the series combination of L1 and L2. As above, the overall signal voltage ratio is made equal to the power voltage ratio of the bypassed transformer.

An advantage of the invention, in addition to the functions described above, is to provide by means of the inductance L1 a protective limit to the transmission of voltage transients around the transformer in either direction.

DESCRIPTION OF PREFERRED EMBODIMENTS

Figure 1:
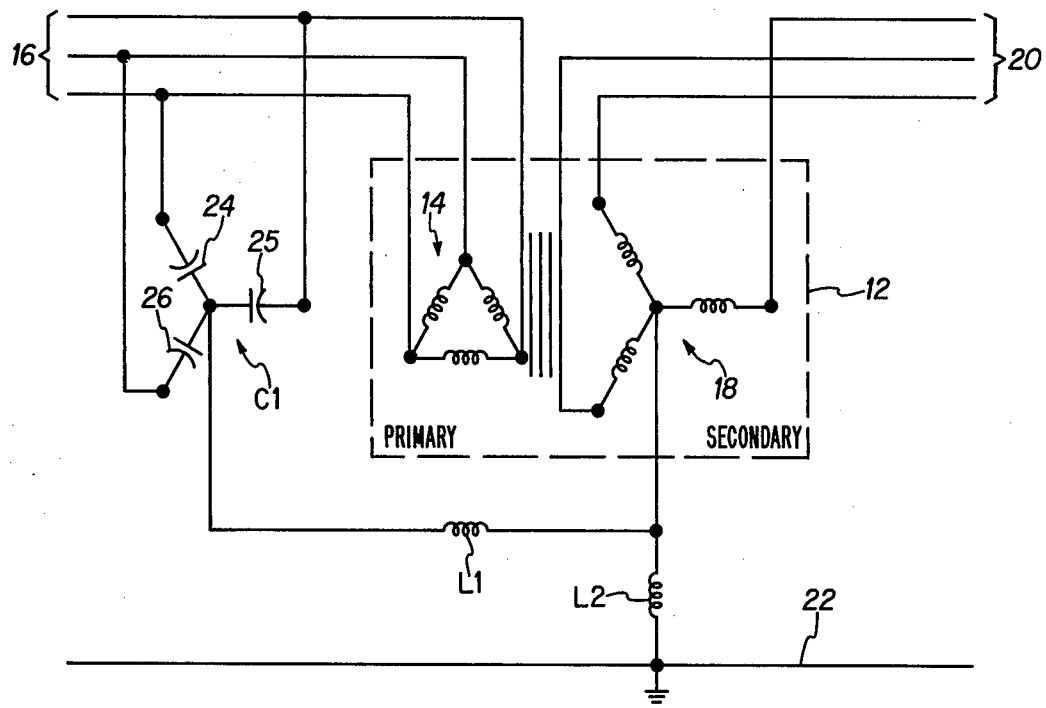
FIG. 1 is a schematic diagram of one embodiment of a bypass circuit according to the invention, shown bypassing a delta-wye transformer.

FIG. 1 shows a first embodiment of a bypass circuit according to the invention, as applied to a delta-wye transformer 12. The primary delta windings 14 of the transformer are connected to three phase lines 16. The secondary wye windings 18 of the transformer are connected to three-phase lines 20. The common neutral for the three phase lines is designated 22. The communication signal for which the bypass is conceived is a balanced phase-to-neutral signal. That is, the signal voltage with respect to neutral 22 is designed to be the same on each of the lines 16. Likewise, the voltage with respect to neutral on each of the lines 20 is designed to be the same.

Insofar as power is concerned, the delta windings 14 form the primary side of transformer 12. By contrast, the comunication signal is to be transmitted not only from lines 16 to lines 20, but also in the direction from lines 20 to lines 16. The bypass of the invention is intended to be particularly useful with communication signals having a carrier frequency, $f_c$, in the range 3-10 KHz.

The bypass circuit according to the invention includes three capacitors 24-26, of equal capacitance, each having one terminal or side connected to a different one of the lines 16. The capacitors have their other terminals connected together at a node to form a wye configuration. The capacitance of the parallel combination of capacitors 24-26 is C1.

An inductor with inductance L1 is connected between the node of the wye configuration of capacitors and the node of the wye transformer winding 18. A neutral grounding reactor with inductance L2 is connected from the node of the wye transformer winding 18 to common neutral 22.

To reduce the coupling impedance of the circuit of FIG. 1 and to maximize the signal level transmitted in both directions, the values of the circuit reactances are selected so that the capacitors 24–26, considered in parallel, are resonant at the signal carrier frequency $f_c$ with the series combination of inductances L1 and L2. That is, $(2\pi f_c)^2 = 1/C1(L1+L2)$.

In order that the ratio of the signal voltage on the lines 16 to that on lines 20 be the same as the ratio R of the power voltages on lines 16 to the power voltages on lines 20, L1 and L2 are selected so that $(L1+L2)/L2 = R$. With these values, signal voltages bypassing the transformer in either direction experience the same transformation as if they had passed through the transformer. A customer distribution transformer which would transform the voltage on lines 16 down to 120 volts, would transform the communications signal by the same degree down to some particular range of voltages. A second customer distribution transformer on the other side of transformer 12, which would provide a 120-volt customer voltage from lines 20 would transform the communications signal down to the same voltage range as at the output of the first customer distribution transformer, since the signal voltage ratio of the bypass circuit equals the power voltage ratio of the transformer. It is of apparent utility to have the communication signals appearing at various customer sites be in the same voltage range, so that the power line communications equipment can be standardized. For this reason, it is important that the bypass circuit exhibit the same voltage ratio as the power voltage ratio of transformer 12.

The series reactance of the wye configured windings of the transformer 12 are minimized to the self reactance of the transformer because equal signal currents flow from the common wye point to each phase, causing a circulating current in the delta configured windings. A like condition applies when signals are flowing in the opposite direction. The impedance of the neutral grounding reactor 28 is preferably coordinated with the characteristics of the transformer to equalize phase-to-neutral power fault currents with those of phase-to-phase faults.

Figure 2:
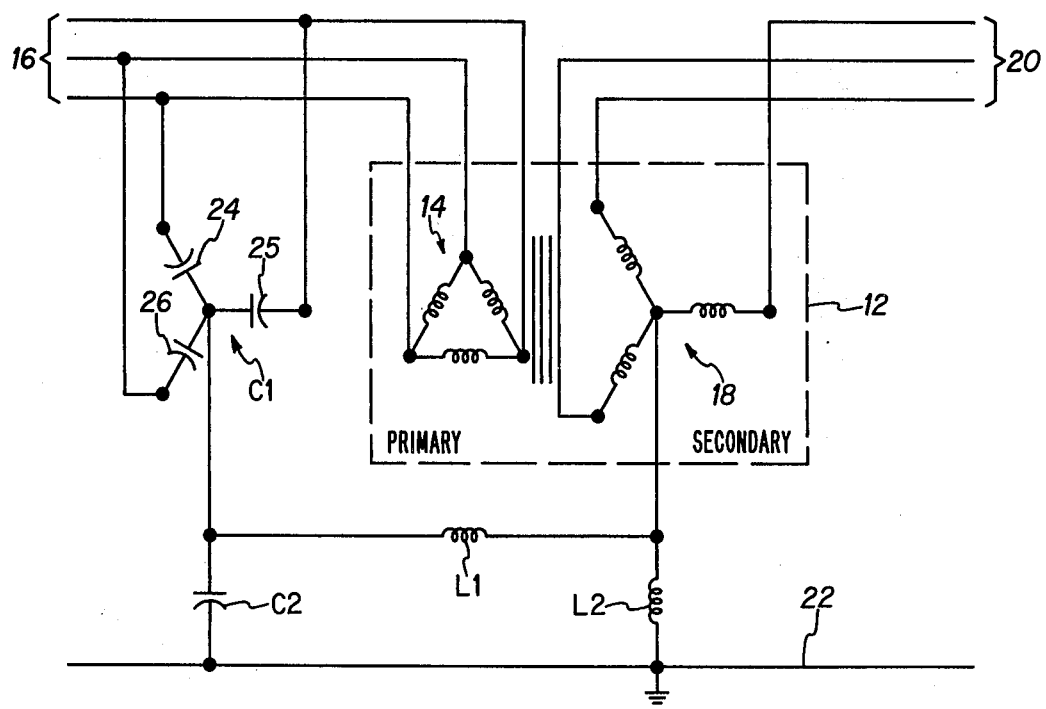
FIG. 2 is a schematic diagram of a second embodiment of a bypass circuit according to the invention.

FIG. 2 shows another embodiment of the present invention. In this embodiment, the addition of a capacitor with capacitance C2, connected from the wye node of capacitors 24–26 to common neutral, makes possible a lower reactance between lines 16 and lines 20 for the communications signal. The series combination of inductances L1 and L2 is resonated at the carrier frequency $f_c$ by the parallel combination of capacitances C2 and C1. That is, $(2\pi f_c)^2 = 1/(C1+C2)(L1+L2)$.

As compared with the circuit of FIG. 1, the resonance condition for FIG. 2 can be met using a much smaller value of L1. The inductance L2 will be considered relatively fixed due to coordination with the parameters of the transformer 12, as described above. Considering the Q of the circuit, the reactance due to L1 at resonance varies directly with L1 and inversely with Q. This reactance is reduced not only directly due to the use of a lower value of L1, but also due to the higher Q achievable with the lower total inductance (L1+L2). By lowering this reactance at resonance, the communication signal loss is reduced. In the extreme, L1 can be reduced to zero, simply connecting those sides of inductance L2 and capacitance C2 which are not connected to neutral. This option will be discussed further in connection with FIG. 3 below.

As in the circuit of FIG. 1, it is advantageous to have the voltage transformation ratio of the bypass circuit be the same as the power voltage transformation ratio R of transformer 12. This is accomplished for the circuit of FIG. 2 by selecting C1, C2, L1 and L2 so that $$\left[\frac{C2}{C1} + 1\right]\left[\frac{L1}{L2} + 1\right] = R.$$

It can be seen that as C2 approaches zero, the circuit of FIG. 2 approaches that of FIG. 1. It can also be seen that as L1 approaches zero, the entire voltage transformation ratio is determined by the capacitances C1 and C2.

When the inductance L1 is not zero, it serves a useful function as a protective limit to the transmission of voltage transients around the transformer 12 in either direction. The improved circuit of FIG. 2 permits greater flexibility in coordinating this transient limiting feature with other protective devices, while simultaneously reducing signal losses and providing a signal voltage transformation ratio compatible with the power voltage transformation ratio of the bypass transformer.

Figure 3:
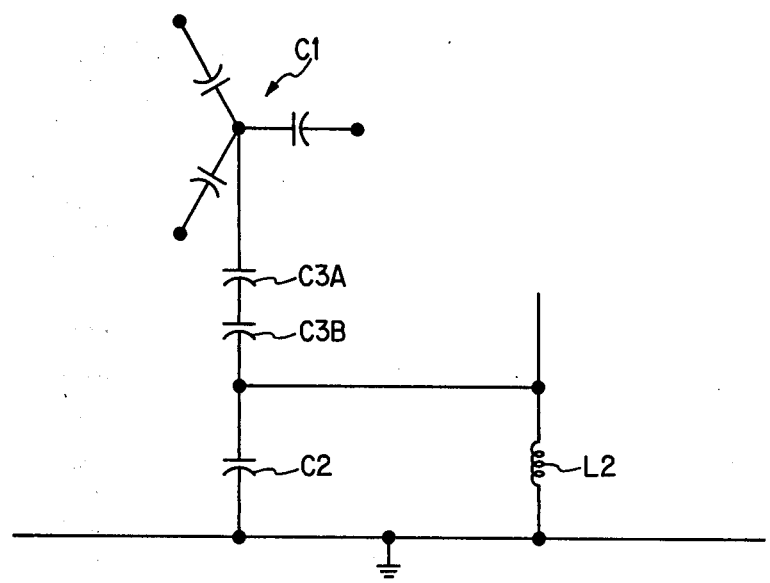
FIG. 3 is a schematic diagram of a variation of the embodiment of FIG. 2.

FIG. 3 shows a variation of the bypass circuit of FIG. 2, without showing the transformer and three phase lines. The bypass circuit is different from that of FIG. 2, in that the inductance L1 has been eliminated, and additional capacitances C3A and optional C3B have been inserted between capacitance C2 and capacitance C1. In the configuration of FIG. 3, the insertion of the capacitances C3A and/or C3B and the removal of inductance L1 reduce cost and facilitate the choice of standard capacitors having the proper voltage characteristics.

I claim:

1. A circuit for bidirectionally bypassing a delta-wye transformer, having a primary-to-secondary voltage ratio R, with a communication signal having a carrier frequency, which signal is to be transmitted as a balanced phase-to-neutral signal on three-phase lines on the delta windings side of the transformer and on the wye windings side thereof, comprising:
    a set of three capacitors, each having one side thereof connected at a node to form a wye configuration, and each having the other side connected to a different one of the lines on the delta side of the transformer;
    an inductor with inductance L1 connected between the node of the wye configuration of capacitors and the common node of the wye windings of the transformer; and
    an inductive reactor with inductance L2 connected from the node of the wye windings of the transformer to a common neutral for the three phase lines,
    said capacitors, inductor and inductive reactor being selected with values so that the parallel combination of the capacitors is substantially resonant at the carrier frequency with the series combination of L1 and L2.

2. The circuit of claim 1 wherein the values of L1 and L2 are selected so that additionally (L1+L2)/L2 is approximately equal to R.

3. The circuit of claim 1 further including a capacitor with a capacitance C2 connected from the node of the wye configuration of capacitors to the common neutral, said capacitors, inductor and inductive reactor being selected with values so that the parallel combination of the capacitors is substantially resonant at the carrier frequency with the series combination of L1 and L2.

4. The circuit of claim 3 wherein the values of C1, C2, L1 and L2 are additionally selected so that (C2/C1+1) (L1/L2+1) is approximately equal to R.

5. A circuit for bidirectionally bypassing a delta-wye transformer, having a primary to secondary voltage ratio R, with a communication signal having a carrier frequency, which signal is to be transmitted as a balanced phase-to-neutral signal on three phase lines on the delta windings side of the transformer and on the wye windings side thereof, comprising:

a set of three capacitors, each having one side thereof connected at a node to form a wye configuration, and each having the other side connected to a different one of the lines on the delta side of the transformer; and a network connected from the node of the wye configuration of capacitors to the common neutral for the three phase lines, including an inductive reactor with inductance L2 connected on one side to the node of the wye windings of the transformer and on the other side to said neutral, said capacitors and said network including said reactor being selected so that the parallel combination of the capacitors is resonant with the network at the carrier frequency.

6. The circuit of claim 5:

wherein said inductive reactor is connected on said one side to the node of the wye configuration of capacitors; and said network further including a capacitor with capacitance C2 connected in parallel with said inductive reactor.

7. The circuit of claim 6, including a further capacitance inserted in the connection between said one side of the inductive reactor and the node of the wye configuration of capacitors.

* * * * *